Figure 1:
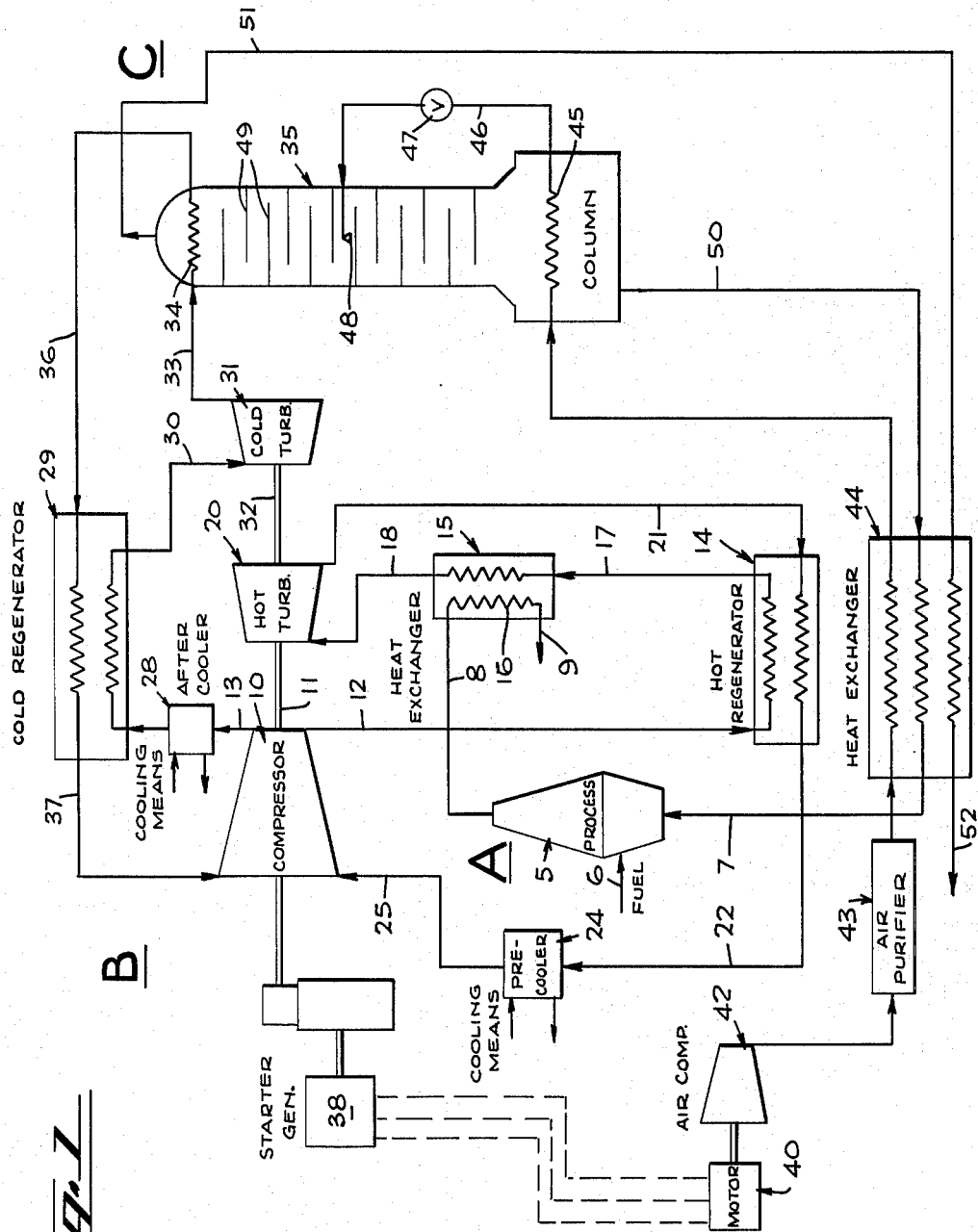

March 22, 1966    J. K. LA FLEUR    3,241,327
WASTE HEAT RECOVERY FOR USE IN AIR FRACTIONATION
Filed Dec. 18, 1963    2 Sheets-Sheet 1

JAMES K. LaFLEUR
INVENTOR.

BY Max Gelden

ATTORNEY

3,241,327
WASTE HEAT RECOVERY IN AIR FRACTIONATION
James K. La Fleur, Hermosa Beach, Calif., assignor to The La Fleur Corporation, Torrance, Calif., a corporation of California
Filed Dec. 18, 1963, Ser. No. 331,494
8 Claims. (Cl. 62—13)

This application is a continuation-in-part of my co-pending applications Serial Nos. 87,311, filed February 6, 1961, now abandoned; 273,883, filed April 18, 1963; and 318,564, filed October 24, 1963, now Patent No. 3,194,026.

This invention relates to the utilization of waste heat from hot gaseous reaction or combustion products, and is particularly concerned with the use of waste heat produced in chemical and metallurgical processes and in other systems, for the separation of oxygen from air.

Many chemical and metallurgical processes, and other systems require the use of air as a source of oxygen for carrying out their reactions or for combustion, and attain high temperatures of operation. To carry out such reactions or to support such combustion, large amounts of air are required. However, many such processes and systems require a substantially greater quantity of oxygen than can be supplied efficiently by utilization of air alone. Thus, for example, great quantities of oxygen are required in blast furnace operations for the production of pig iron and in the gasification of coal. In such processes, it is much more efficient and desirable to employ oxygen or air enriched with oxygen rather than air alone. Also, in certain processes and chemical reactions requiring the use of oxygen, nitrogen must be excluded, thus precluding the use of air as a source of oxygen for such reactions. For example, certain chemical reactions require the use of oxygen and employ a catalyst which nitrogen poisons, such as the partial oxidation of hydrocarbons. Further, in systems where unusually high temperatures are required, as, for example, for operation of a magneto hydro-dynamic power generator for generating electricity, in order to attain the combustion temperatures required, ordinary fuels must be burned with a combustion supporting gas of higher oxygen content than that of atmospheric air.

In order to provide oxygen for the above purposes, air separation processes are generally utilized, but the cost of the generally large amounts of oxygen required in commercial processes and systems such as those exemplified above is great, and often is a substantial factor in the cost of operation of such processes and systems.

In my above-noted copending applications, Serial Nos. 87,311 and 318,564, particularly Serial No. 87,311, there is disclosed a power refrigeration system employed in conjunction with and for the operation of an air separation process, said air separation process being further described in Serial No. 273,883. Such system requires the use of heat for the operation of the power and refrigeration cycles to produce a refrigerant required in the air separation unit for producing oxygen.

It is an object of the invention to utilize the waste heat from a chemical process or from a system, as a source of power for separation of a gas component from a gas mixture, said gas component being employed in said chemical process or system.

Another object of the invention is to employ the waste heat from a chemical process or from a system which utilizes oxygen for combustion or for carrying out a reaction, as a source of power for the separation of air to produce oxygen.

Another object is the provision of a process or system employing such waste heat for the operation of an air separation process for production of oxygen, and utilizing such oxygen for operation of the chemical process or system supplying such waste heat.

A still further object is to provide a process and equipment which utilizes waste heat from a chemical process or system to power a refrigeration cycle and in turn employ the refrigerant produced therein in an air separation cycle to produce the oxygen employed in such chemical process or system.

Other objects and advantages will in part be apparent and in part be obvious from the following description of the invention.

In the present invention, a process and system are provided in which waste heat, e.g., from the combustion products of a chemical process, is utilized to heat the circulating fluid or medium in the power cycle of a power-refrigeration system preferably of the type described in my above co-pending applications, and wherein such heated fluid is used to provide the power necessary to supply a refrigerant at sufficiently low temperature for use in an air separation process, preferably of the type described in my above co-pending applications, Serial Nos. 87,311 or 273,883, for producing oxygen. The oxygen so produced is then circulated to the chemical process or system to operate the process from which the waste heat is derived for producing such oxygen.

As previously noted, in preferred practice the waste heat from a chemical process or system, e.g., in the form of hot combustion gases, is passed into heat exchange relation with the hot compressed gas, e.g., helium, in the process of the above co-pending applications, which functions both as power and refrigerating medium in such process, to further heat such hot compressed gas, and the resulting hot gas is fed into the hot power turbine of the system to provide the major portion of the power required initially to compress such power fluid and refrigerating fluid medium. A portion of such compressed fluid is cooled and expanded in the refrigerating cycle to provide a refrigerant gas, e.g., helium, at low temperature. Such refrigerant at low temperature is passed into the upper portion of a fractionating column employed in the process of air separation described in Serial Nos. 87,311 and 273,883, for producing liquid oxygen in the lower portion of the tower. Oxygen withdrawn from the bottom of such column is then circulated to such chemical process or system from which the waste heat was initially derived, and is used to support combustion and/or to activate the reaction in said chemical process or system.

In accordance with the instant invention, by using the waste heat from a chemical process or a system as power for separating air or for a combined refrigeration-air separation process, and utilizing the oxygen so separated in such chemical process or system, such oxygen can be produced much more cheaply than ordinary oxygen supplied to such process or system from an extraneous source, due to the utilization of the waste heat in producing the oxygen. An additional important advantage of the invention process is the production of other gases such as nitrogen and argon in the air separation process, which can be marketed commercially, thus effecting a still further economy in the primary production of oxygen for utilization in the chemical process or system furnishing the waste heat. A particularly important advantage of the instant invention process and system is that by tying or combining the operation for the separation of air and production of oxygen, with the chemical process or system requiring such oxygen in its operation, a continuous and uninterrupted supply of oxygen is available for such process or system, without dependence on outside sources of oxygen.

The principles of the invention, and the greatest advantages thereof, are derived when the waste heat utilization concept hereof is applied to the power-refrigeration operation in conjunction with the air separation operation described in my above co-pending applications and in detail below. Due to the efficiency of such operations and the ease and economy with which they are carried out, and the relatively small amount of equipment required therein, these operations or systems can be readily applied for the utilization of the waste heat and the production of oxygen for supplying the waste heat-producing process, at a substantially reduced cost per ton of oxygen. Further, the equipment required to carry out such power-refrigeration and air separation operations is compact and can be readily installed at the site of the chemical process or system producing the waste heat.

Figure 2:
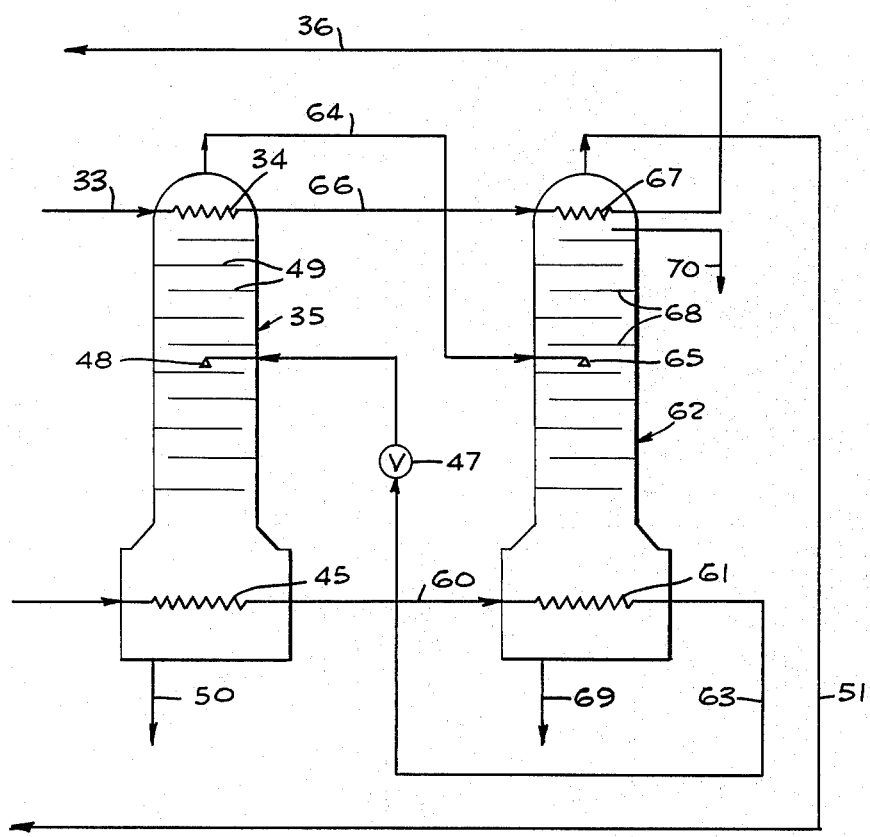

The invention will be more readily understood by the description below of certain embodiments of the invention, taken in connection with the accompanying drawing, wherein:

FIG. 1 is a schematic drawing or flow sheet of a preferred embodiment of the invention; and FIG. 2 is a schematic representation of a modification of the system of FIG. 1.

Referring to FIG. 1 of the drawing, A, B and C represent the combined units of the system, A being the waste heat-producing and oxygen-consuming unit, B the power-refrigeration unit, and C the air separation unit. Referring to unit A, the numeral 5 represents a chemical or metallurgical processing operation such as, for example, a blast furnace for the manufacture of pig iron. Fuel is introduced into the lower end of the furnace at 6, and oxygen, produced in the air separation system described below, is introduced through line 7 into the bottom of the furnace to support the combustion of the fuel. The hot, gaseous reaction products produced in the furnace 5 are conducted through a conduit 8 into the coil 16 of a heat exchanger 15, the exiting cooled reaction products being vented through a conduit 9. In the heat exchanger 15, the hot reaction products from the furnace 5 pass in counter-current heat exchange relation with the power supplying medium or gas of a power-refrigeration system B described below for heating of such medium to high temperature prior to passage thereof into a prime mover.

Referring now to the power and refrigeration cycles B in which the waste heat from the hot reaction gases passing through the heat exchanger 15 is utilized for producing power for supplying a refrigerant at sufficiently low temperatures for the air separation process, the working gas medium for both the power and refrigeration cycles should have a boiling point at atmospheric pressure lower than that of the gas component to be liquefied. Thus, for the separation or liquefaction of oxygen from air, the working gas medium should have a boiling point lower than that of oxygen, and where nitrogen and argon are also to be separated, such gas medium preferably should have a boiling point lower than the boiling point of nitrogen. For the separation of air according to the instant process, it is preferred to employ hydrogen, helium or neon as the working gas medium, although other gases can be employed, if desired. In the instant process, the system will be described as using helium as a working gas medium for both the power and refrigeration cycles.

Assuming the whole system of power and refrigeration has been in operation for sufficient time to reach the intended operating conditions of temperature and pressure, helium enters a compressor turbine 10 at a pressure of 181 p.s.i. and a temperature of 350° R. (Rankine). Helium is discharged from the high-pressure side of the compressor at 268 p.s.i. and 618° R. The flow from the compressor outlet is divided into two high-pressure side streams, namely, a power stream which flows through one branch 12 or power loop and a refrigeration stream which flows through another branch 13 or refrigeration loop. The high-pressure side of the power stream or the hot stream first passes through one side of a regenerator 14, which is the power or hot regenerator, wherein it is heated to an exiting temperature of 1493° R. From the regenerator the high-side power stream passes through a conduit 17 and through the above-noted heat exchanger 15 in counter-current relation to the hot reaction gases from the metallurgical process taking place at 5. The hot gas exiting the heat exchanger 15 is at a temperature of 1660° R. and is conducted through a conduit 18 into a hot turbine 20 which provides a major portion of the power for driving the compressor 10 via the connecting shaft 11. The gas expands and cools in the turbine, the pressure dropping to 190 p.s.i. and the temperature dropping to 1498° R., and then passes via conduit 21 through the low-pressure side of the hot regenerator 14 wherein it is cooled while heating the power stream in counter-current flow thereto. The cooled gas exiting the hot regenerator then passes via a conduit 22 through a pre-cooler 24 from which it is returned via line 25 to the compressor 10. The pre-cooler may be water- or air-cooled and serves to bring the working medium down to ambient temperature. The above-described circuit constitutes the power cycle of the power-refrigeration system indicated at B in FIG. 1 of the drawing.

The cold or refrigeration stream that flows through conduit 13 passes first through an after-cooler 28 where it is cooled to 530° R., the pressure drop being slight, about 5 p.s.i. The stream then passes through a regenerator 29, the cold regenerator, where it is cooled to about 141° R. The cooled gas emerging from regenerator 29 passes through conduit 30 into a turbine 31, referred to as the cold turbine, wherein the gas expands with a drop in temperature to 128° R. The cold turbine 31 serves as a source of additional power to the compressor 10 via the shaft 32. If desired, however, the cold turbine can instead be connected to an independent load. The cooled low-pressure stream of helium then passes via conduit 33 through a coil 34 at the top of a fractionating column 35 of the air separation unit C described below. From coil 34 the low-pressure helium returns via conduit 36 to the cold regenerator 29 where it serves to cool the helium prior to its passage to the cold turbine 31. The warmed helium exiting the cold regenerator 29 then returns via conduit 37 to the compressor 10 at ambient temperature and compressor inlet pressure of 181 p.s.i., thus completing the refrigeration loop of the power-refrigeration system indicated at B in the drawing. Initially, to place the power-refrigeration system in operation, a starter generator unit 38 driven by motor 40 is employed until the system reaches a point where it is thereafter self-sustaining.

Referring now to the air separation unit of the process, indicated generally at C in the drawing, atmospheric air is drawn into a rotary compressor 42 driven by the motor 40, wherein the air is compressed to approximately 45 p.s.i. and then flows through an air purifier 43 to remove contaminants such as carbon dioxide, sulfur and water. The compressed, purified air then flows to a regenerative heat exchanger or pre-cooler 44 where the air is cooled to about 177° R. by the counter-passage of the oxygen withdrawn from the bottom of fractionating column 35 and the nitrogen-containing gas leaving the top of column 35, as will be described hereinafter. The air stream exiting the regenerative heat exchanger 44 is now chilled to near its condensation point. The so-cooled air is then passed through the reboil coil 45 in the bottom of the fractionating column 35 wherein the air is condensed to liquid form and the liquid air emerges from coil 45 at a temperature of about 163° R. The heat necessary to be removed from the air passing through coil 45 to accomplish the condensation of the air therein is removed by the boiling of the liquid oxygen which accumulates in the bottom of column 35.

The liquid air is then conducted through a conduit 46 and passed through an expansion valve 47 into the column 35 at 48, where it is permitted to expand to substantially atmospheric pressure. The liquid air is introduced into the column 35 at approximately midway of the top and bottom of the column, and at a point corresponding substantially to the composition of air in the column. The fractionating column 35 may be of conventional design, having means (not shown in detail) such as bubble cap trays 49, to bring the gas passing upward in the column and through the bubble cap trays into intimate contact with reflux liquid passing downward, over and through the trays therein. The column 35 is operated close to, but somewhat above, atmospheric pressure. The refrigeration provided by the cold coil 34 at the top of the column, through which the low-temperature helium passes, as described above, liquefies some of the nitrogen to provide the necessary reflux to keep the column operating, while the boiling oxygen which collects at the bottom of the column provides ascending vapors for upward passage into contact with the descending liquid at the various bubble cap trays 49. This results in the fractional distillation and separation of the air into oxygen in liquid form at the bottom of the column and a nitrogen-argon gaseous mixture which is withdrawn at the top of the column. Such nitrogen-argon mixture passes through conduit 51 and through the heat exchanger 44 in counter-current relation with respect to the compressed incoming air to cool the same, and the exiting nitrogen-argon mixture is withdrawn at 52.

Oxygen is withdrawn from the bottom of column 35 and is warmed to ambient temperature by passage of the gas through the heat exchanger 44 to further aid in the cooling of the incoming compressed air. The warmed exiting oxygen gas from the heat exchanger 44 is then conducted via the conduit 7 to the chemical process at 5 of unit A, where it can be used alone, or if desired, it can be mixed with air, for carrying out the chemical reaction, thus completing the entire cycle of operations of the process comprising the chemical process wherein waste heat is produced indicated at A, in combination with the power-refrigeration unit indicated at B for the use of such waste heat to produce cooled helium at 34, and the air separation process indicated at C for producing the oxygen employed in A.

If desired, and in order to provide further economies in connection with the overall process herein described, the nitrogen-argon mixture withdrawn from the top of the fractionating column at 51 can be processed further to separate the components of such mixture.

Referring to FIG. 2 of the drawing, illustrating the separation of air into all three of its components, oxygen, nitrogen and argon, employing the invention principles, the same numerals are employed in FIG. 2 as in FIG. 1 to represent the same parts as described above in connection with FIG. 1.

In the modification of FIG. 2, the air separation unit C is designed so that the compressed and pre-cooled air passes first through the reboil coil 45 in fractionating column 35 and then via conduit 60 into the reboil coil 61 at the bottom of a second fractionating column 62, liquid air at about 163° R. emerging from the last coil 61. The liquid air is then conducted via conduit 63 and metered into the first column 35 via expansion valve 47, as previously described. The passage of air through the reboil coil 61 following its passage through reboil coil 45 of column 35, is required to supply heat to the bottom of the column 62 and to the liquid argon collected therein, as described below.

In FIG. 2, the mixture of nitrogen and argon gas withdrawn from the top of column 35 is fed via conduit 64 into the second fractionating column 62 substantially midway between the top and bottom theerof and substantially at the point corresponding to the composition of this gas mixture in column 62, the gas being introduced into column 62 via the distributor 65. In order to carry out fractionation of the argon-nitrogen mixture in fractionating column 62, helium refrigerant exiting the coil 34 at the top of the first column 35 is conducted via conduit 66 into the refrigerating coil 67 in the upper end of the fractionating column 62, prior to being returned via conduit 36 to the cold regenerator 29 as described above.

Fractionating column 62 is of substantially the same construction as column 35, containing bubble cap trays, as at 68, and operates in substantially the same manner as column 35, for separation of nitrogen and argon. The argon liquefies and collects in the bottom of the column for removal through conduit 69. A large proportion of the nitrogen is liquefied by the cold coil 67 at the top of the column, and the liquid nitrogen is removed by conduit 70. The remaining nitrogen gas is removed as overhead from the top of column 62, and is passed via conduit 51 through heat exchanger 44, as described above.

From the foregoing, it is seen that the invention provides a novel and valuable system for furnishing oxygen at a low cost to an oxygen-consuming chemical or metallurgical process without the danger or inconvenience of any interruption in the supply of oxygen required, by utilizating the waste heat of the chemical or metallurgical process, or other system, for supplying the power to produce such oxygen in operations which are directly connected to the chemical or metallurgical process or other system.

While I have described particular embodiments of my invention for the purpose of illustration, it should be understood that various modifications and adaptations thereof may be made within the spirit of the invention, as set forth in the appended claims.

I claim:

1. A process for utilizing waste heat from a system employing oxygen for operation which comprises operating a system utilizing oxygen and producing hot gaseous waste products, passing said hot gaseous waste products into heat exchange relation with a compressed gas to heat same, introducing said hot compressed gas into a prime mover for compression of a refrigerant, expanding said compressed refrigerant and cooling same to a point below the boiling point of oxygen at about atmospheric pressure, passing said cooled refrigerant in heat exchange relation with air and separating oxygen from said air, and introducing said oxygen into said system producing said hot gaseous waste products, recompressing the gas discharged from said prime mover and recirculating said compressed gas for heating thereof by said hot gaseous waste products as aforesaid, and recirculating said refrigerant from said heat exchange relation with air, for compression of said refrigerant as aforesaid.

2. A process for utilizing waste heat from a system employing oxygen for operation and producing hot gaseous waste products, which comprises passing said hot gaseous products into heat exchange relation with a compressed gas having a boiling point at atmospheric pressure lower than the boiling point of oxygen, said compressed gas flowing in a closed power loop, introducing said hot compressed gas into a prime mover and expanding said gas, cooling said gas, compressing said gas, circulating a portion of said compressed gas in a closed refrigeration loop, cooling said last-named portion of said compressed gas, expanding said cooled compressed gas and cooling same further to a temperature below the boiling point of oxygen at about atmospheric pressure, passing said cooled refrigerant in heat exchange relation with air, separating oxygen from said air, and introducing said oxygen into said system producing said hot gaseous waste products.

3. A process as defined in claim 2 wherein said gas having a boiling point at atmospheric pressure lower than the boiling point of oxygen is a gas selected from the group consisting of hydrogen, helium and neon.

4. A process for utilizing waste heat from a system employing oxygen for operation and producing hot gaseous waste products, which comprises passing said hot gaseous products into heat exchange relation with a compressed gas having a boiling point at atmospheric pressure lower than the boiling point of oxygen, said compressed gas flowing in a closed power loop, introducing said hot compressed gas into a prime mover and expanding said gas, cooling said gas, compressing said gas, circulating a portion of said compressed gas in a closed refrigeration loop, cooling said last-named portion of said compressed gas, expanding said cooled compressed gas and cooling same further to a temperature below the boiling point of oxygen at about atmospheric pressure, liquefying air, introducing said liquefied air into a fractionating zone and permitting said liquefied air to expand therein, passing said cooled refrigerant into heat exchange relation with the upper end of said fractionating zone to remove heat therefrom, collecting liquid oxygen at the bottom of said fractionating zone, and withdrawing said oxygen and introducing said oxygen into said system producing said hot gaseous waste products.

5. A process for utilizing waste heat from a system employing oxygen for operation and producing hot, gaseous waste products which comprises compressing substantially a gaseous refrigerant medium having a boiling point at about atmospheric pressure lower than the boiling point of oxygen, dividing the compressed medium into a first stream and a second stream, passing said hot, gaseous products from said system into heat exchange relation with said first stream to raise the temperature thereof substantially, allowing the heated first stream to expand and deriving mechanical energy therefrom to provide part of the power required to compress the medium, cooling the second stream, allowing the second stream to expand, passing said expanded second stream in heat exchange relation with air to absorb heat therefrom at a very low temperature, condensing oxygen from said air, and introducing said oxygen into said system producing said hot, gaseous waste products.

6. A process for utilizing waste heat from a system employing oxygen for operation and producing hot, gaseous waste products, which comprises compressing substantially a gaseous refrigerant medium having a boiling point at about atmospheric pressure lower than the boiling point of oxygen, compressing said medium substantially, dividing the compressed medium into a first stream and a second stream, passing said hot, gaseous products from said system into heat exchange relation with said first stream to raise the temperature thereof substantially, allowing the heated first stream to expand and deriving mechanical energy therefrom to provide part of the power required to compress said medium, cooling the second stream, allowing the second stream to expand, and deriving mechanical energy therefrom to provide the remainder of the power required to compress the medium, passing said cooled, expanded second stream into heat exchange relation with the upper end of a fractionating zone for the separation of air, to remove heat from the upper end of said zone, liquefying air, introducing said liquefied air into said fractionating zone and permitting said liquefied air to expand therein, supplying heat to the lower end of said fractionating zone, collecting liquid oxygen at the bottom of said fractionating zone, and withdrawing said liquid oxygen and introducing said oxygen into said system producing said hot, gaseous waste products.

7. A process for utilizing waste heat from a system employing oxygen for operation and producing hot, gaseous waste products, which comprises passing said hot, gaseous products into heat exchange relation with a compressed gas having a boiling point at atmospheric pressure lower than the boiling point of oxygen, said compressed gas flowing in a closed power loop, introducing said hot compressed gas into a prime mover and expanding said gas, cooling said gas, compressing said gas, circulating a portion of said compressed gas in a closed refrigeration loop, cooling said last-named portion of said compressed gas, expanding said cooled compressed gas and cooling same further to a temperature below the boiling point of oxygen at about atmospheric pressure, passing said cooled refrigerant in heat exchange relation with the upper end of an air fractionating zone to remove heat therefrom, liquefying air by moderately compressing it and subsequently cooling it sufficiently to liquefy the same, allowing the liquefied air to expand by introducing the same intermediate the upper and lower ends of said fractionating zone, the interior of said zone being maintained at about atmospheric pressure, supplying heat to the lower end of said zone, withdrawing a mixture of gaseous nitrogen and argon from the upper end of said fractionating zone, withdrawing oxygen from the lower end of said fractionating zone, passing said oxygen into heat exchange relation with said compressed air to partially cool same, and introducing the exiting oxygen into said system producing said hot, gaseous waste products.

8. A system for utilizing waste heat from a unit employing oxygen for operation and producing hot, gaseous waste products, including in combination, said waste heat-producing unit, a power-refrigeration unit, and an air separation unit, which comprises a compressor having an exhaust side and intake side, a first turbine mechanically connected to drive said compressor, a second turbine, conduit means extending from the exhaust side to the intake side of the compressor providing a hot circuit for flow of part of the medium leaving the compressor, conduit means extending from the exhaust side to the intake side of the compressor providing a cold circuit for the flow of the remainder of the medium leaving the compressor, said first turbine being connected into said hot circuit and said second turbine being connected into said cold circuit, a unit operating to produce waste heat, heat exchange means for transferring heat from the hot reaction products of said unit producing waste heat to the medium in said hot circuit at a region between the compressor exhaust side and said first turbine, a means between said compressor exhaust side and said second turbine in said cold circuit for cooling the medium therein, a fractionating tower, a load heat exchanger located in the upper portion of said tower, said load heat exchanger being located between said second turbine and the compressor intake side in said cold circuit, means for compressing air, conduit means from the compressor to said tower, a heat exchange section in said conduit means located within the lower portion of the tower, conduit means from said heat exchange section communicating with said tower at a point intermediate the top and bottom thereof, and conduit means from the lower portion of said tower to the lower end of said unit for producing waste heat.

References Cited by the Examiner

UNITED STATES PATENTS

| | | | |
|---|---|---|---|
| 1,360,853 | 11/1920 | Wucherer | 62—40 X |
| 1,664,205 | 3/1928 | Fonda | 62—31 |
| 2,394,253 | 2/1946 | Nettel | 62—402 X |
| 2,409,159 | 10/1946 | Singleton | 62—402 X |
| 2,458,894 | 1/1949 | Collins | 62—40 X |
| 2,471,123 | 5/1949 | Rouy | 62—402 X |
| 2,685,181 | 8/1954 | Schlitt | 62—40 X |
| 2,760,356 | 8/1956 | Sixsmith | 62—9 |
| 2,824,433 | 2/1958 | Kohler | 62—40 X |
| 2,929,217 | 3/1960 | Collman. | |
| 2,952,138 | 9/1960 | Russell. | |
| 3,162,519 | 12/1964 | Peters | 62—40 X |

NORMAN YUDKOFF, *Primary Examiner.*

J. JOHNSON, *Examiner.*